(12) United States Patent
Xu

(10) Patent No.: US 7,730,030 B1
(45) Date of Patent: Jun. 1, 2010

(54) RESOURCE BASED VIRTUAL COMMUNITIES

(76) Inventor: Yongyong Xu, 630 Santa Cruz Ter., Sunnyvale, CA (US) 94085

( * ) Notice: Subject to any disclaimer, the term of this patent is extended or adjusted under 35 U.S.C. 154(b) by 194 days.

(21) Appl. No.: 10/710,964

(22) Filed: Aug. 15, 2004

(51) Int. Cl.
G06F 7/00 (2006.01)
G06F 17/00 (2006.01)

(52) U.S. Cl. .................. 707/617; 707/627; 707/636; 707/758; 707/802

(58) Field of Classification Search .................. 707/1
See application file for complete search history.

(56) References Cited

U.S. PATENT DOCUMENTS

| | | | |
|---|---|---|---|
| 6,148,328 A | 11/2000 | Cuomo et al. ............... 709/204 |
| 6,161,149 A | 12/2000 | Achacoso et al. ............... 710/4 |
| 6,212,548 B1 | 4/2001 | DeSimone et al. .......... 709/204 |
| 6,219,045 B1 | 4/2001 | Leahy et al. ................ 345/757 |
| 6,408,309 B1 | 6/2002 | Agarwal .................. 707/104.1 |
| 6,519,629 B2 * | 2/2003 | Harvey et al. ............... 709/204 |
| 6,571,234 B1 | 5/2003 | Knight et al. .................. 709/3 |
| 6,611,822 B1 | 8/2003 | Beams et al. ................. 706/11 |
| 6,629,100 B2 | 9/2003 | Morris et al. ................. 707/10 |
| 6,629,129 B1 | 9/2003 | Bookspan et al. ............. 709/24 |
| 6,631,496 B1 | 10/2003 | Li et al. .................... 715/501.1 |
| 6,640,241 B1 | 10/2003 | Ozzie et al. ................. 709/204 |
| 6,684,212 B1 | 1/2004 | Day et al. ..................... 707/10 |
| 6,708,172 B1 | 3/2004 | Wong et al. ................... 707/10 |
| 6,729,885 B2 | 5/2004 | Stuppy et al. ............... 434/322 |
| 7,035,926 B1 * | 4/2006 | Cohen et al. ............... 709/225 |
| 7,069,300 B2 * | 6/2006 | Toyota et al. .............. 709/206 |
| 2002/0046051 A1 * | 4/2002 | Katzman et al. ............... 705/1 |
| 2002/0083134 A1 | 6/2002 | Bauer, Jr. et al. .............. 709/24 |
| 2002/0085029 A1 | 7/2002 | Ghani ......................... 345/751 |
| 2002/0097267 A1 * | 7/2002 | Dinan et al. ................ 345/757 |
| 2002/0120757 A1 * | 8/2002 | Sutherland et al. .......... 709/229 |
| 2002/0143691 A1 | 10/2002 | Ramaley et al. ............... 705/37 |
| 2003/0023624 A1 | 1/2003 | Hamilton, II et al. ..... 715/501.1 |
| 2003/0028595 A1 * | 2/2003 | Vogt et al. .................. 709/204 |
| 2003/0050986 A1 * | 3/2003 | Matthews et al. ........... 709/206 |
| 2003/0060910 A1 | 3/2003 | Williams et al. .............. 700/91 |
| 2003/0149681 A1 | 8/2003 | Frees et al. ..................... 707/1 |
| 2003/0216986 A1 | 11/2003 | Hassan ........................ 705/35 |
| 2004/0003352 A1 | 1/2004 | Bargeron et al. ............ 715/530 |

(Continued)

OTHER PUBLICATIONS

"A community authorization service for group collaboration" by Pearlman, L., Welch, V., Foster, I., Kesselman, C. and Tuecke, S.; Policies for Distributed Systems and Networks, 2002. Proceedings. Third International Workshop on Jun. 5-7, 2002 pp. 50-59.*

Primary Examiner—Tim T. Vo
Assistant Examiner—Jay A Morrison

(57) ABSTRACT

This invention disclosed a system and method for resource based virtual communities. Any resources that can be shared or used by multiple people, including Internet resources, software or other resources can be the basis for the community, whose members are users of the resource. Web resources include web sites, web pages, news groups or discussion forums. Other types of resources include software products, bulletin boards, games or other products. The community composes of the current resource users such as web page readers, bulletin board posters, game players, software users. Whenever a person accesses or uses the resource, the user is automatically joined as part of the community. At the same time they are using the resource, they can access all services provide by the community, such as talking with other members, collaborating with others, publishing comments, or even adding new community services.

56 Claims, 8 Drawing Sheets

U.S. PATENT DOCUMENTS

| | | | |
|---|---|---|---|
| 2004/0043818 A1 | 3/2004 | Willis | 463/42 |
| 2004/0049539 A1 | 3/2004 | Reynolds et al. | 709/203 |
| 2004/0073691 A1 | 4/2004 | Sun | 709/230 |
| 2004/0172415 A1* | 9/2004 | Messina et al. | 707/104.1 |
| 2005/0203801 A1* | 9/2005 | Morgenstern et al. | 705/14 |
| 2005/0216381 A1* | 9/2005 | Banatwala et al. | 705/34 |
| 2005/0227216 A1* | 10/2005 | Gupta | 434/322 |
| 2006/0010251 A1* | 1/2006 | Mrsic-Flogel et al. | 709/245 |
| 2006/0036456 A1* | 2/2006 | Wu | 705/1 |

* cited by examiner

RESOURCE BASED VIRTUAL COMMUNITIES

BACKGROUND OF INVENTION

1. Field of Invention

This invention relates to collaboration conducted in the Internet, on-line virtual community, web discussion, bulletin board, Usenet, web based forum, peer to peer (P2P), person to person communication, friend making web sites, online meeting, online chat, instant messaging, interest matching service, comments for web pages, ratings or reviews for web resources. It is also about sending and receiving messages to other users, providing web resource usage info, other statistical information or comments for web surfing. It is also relates to the exchange of information between current resource users, or users with same interests.

2. Prior Arts

The present invention relates to browsing and interacting in the Internet. In particular, the invention introduces a new p2p interactive environment that combines advantages of online community, web browsing, on line chat, web discussion, web comments, resource sharing, collaboration, discussion group, and instant messaging by means of common resource sharing in the Internet.

U.S. Pat. No. 6,519,629 (Feb. 11, 2003) by Harvey, et al disclosed a "System for creating a community for users with common interests to interact in". An Information and Application Distribution System (IADS) is disclosed. The IADS operates, in one embodiment, to distribute, initiate and allow interaction and communication within likeminded communities. Application distribution occurs through the transmission and receipt of an "invitation application" which contains both a message component and an executable component to enable multiple users to connect within a specific community. The application object includes functionality which allows the user's local computer to automatically set up a user interface to connect with a central controller which facilitates interaction and introduction between and among.

That patent requires distributing "invitation application" which is not needed in our system. Users are automatically part of the virtual community of common interests whenever they access the same resource in the Internet.

US patent application 20030028595 (Feb. 6, 2003) by Vogt, Eric E. et al. disclosed a "System for supporting a virtual community". A browser-enabled system of software and services that focuses on connecting people across spatial, temporal, and organizational barriers to achieve specific objectives. The system includes a client server system that provides a virtual meeting place for a learning community and a structure through which that community can achieve its goals. wherein the client server system provides a virtual location for members to develop a virtual online community, wherein the members are invited to participate in the community, and wherein the community is brought together to achieve a predetermined goal.

US patent application 20020085029 by Ghani, Jamal on Jul. 4, 2002 disclosed a "Computer based interactive collaboration system architecture" which provides an electronic system for facilitating communication between a presenter and a plurality of participants over a communication network without downloading software to the presenter and participant computers. The system includes a presenter computer having a graphical user interface to control the display of a presentation, authorize participants to pose a question, and respond to the question; a plurality of participant computers each having a presenter graphical user interface for viewing the presentation, requesting permission to pose a question, and generating the question; and a system server configured for brokering communication between the presenter computer and the plurality of participant computers.

The above two methods are typical collation scenario on the local network. However, in our method, users accessing any resource in the Internet automatically belongs to the virtual community. There is no need for invitation, member registrations or presenter computers.

U.S. Pat. No. 6,708,172 by Wong, et al. on Mar. 16, 2004 disclosed a "Community-based shared multiple browser environments". A web browsing environment that provides a graphical spatial context to associate web sites to one another and allows interaction among users browsing the space. One feature of the described embodiment is the provision of a tiling of mini browsers in one space rather than a document. That invention relates to the computer network user interface methods and associated systems and applications that provide information organization and retrieval as well as user interaction. It provides a graphical spatial context to associate web sites to one another.

Urbanpixel (http://www.urbanpixel.com/) uses a method called contextual collaboration which enables two or more users geographically separated to view and collaborate in a shared view. User 1 has synchronized the view with User 2's view. Both customers are now looking at the same region of the tiled-browser. The collaboration capability enables users to chat in real-time as they modify the space. It is based on the tiled-browser technology of this patent.

Our system and method provides a way to allow collaboration of users with no relationship before. The virtual community is formed by using common resource browsing same web page or using the same software. Furthermore, our method is not simply a linking between web pages, it links users behind all the web pages in real time.

US Patent application 20040049539 by Reynolds, Brian; et al. (Mar. 11, 2004) disclosed "the Interactive web collaboration systems and methods", in which, A topic room is provided in which one or more individuals or other entities may collaborate on topics of mutual interest. Multiple individuals or participants may use the topic room to communicate in real or non-real time and may work together to create, browse, modify, comment on, and perform any other suitable action on content. A chat room within the topic room receives, records, and transmits the communications and all activities in the topic room to all participants as messages. Client processes at a participant's user equipment may listen to the messages and take particular actions. For example, one participant can follow another participant as that participant browses through material by using the messages received from that participant.

Topic room, chat rooms, Usenet, discussion groups or online forums are traditional Internet collaboration methods. Our system is different from what topic or chat room does. Instead relying on any pre-defined topic, our system allows anyone who is accessing any web page or using any web resource to join a virtual community of that resource then, start collaboration on that web resource with others who are also in the virtual community. This is more flexible since there is no need for users to go to a particular chat room, search and join the particular topic.

US Patent application, 20030023624 (Jan. 30, 2003) by Hamilton, Rick Allen II; et al. talks about "Web browser interest terms". A web browser enhancement determines keywords that are of interest to the web browser user, with the interest terms thereafter being available to other programs for use in assisting the web browser user in finding web content of interest to the user. A master list of interest terms is presented to a user, either directly with a master checklist, or indirectly through a series of questions. User selections and answers are recorded, and a user interest term list is created and stored for later availability to other browsing programs and plug-ins.

That patent application is about collecting common user interest terms to enhance user's browsing experience. It has nothing related online community, collaboration or interactivity among web users. In that method, all different clients are connecting to the same central network server, while in our invention, all users accessing the same web resource forms a global virtual community based on that resource. They are connected together due to the common interests to the same resource.

U.S. Pat. No. 6,631,496 by Li, et al. (Oct. 7, 2003) disclosed a "system for personalizing, organizing and managing web information", which provides a hypermedia database for managing bookmarks, which allows a user to organize hypertext documents for querying, navigating, sharing and viewing. The hypermedia database of the present invention parses meta-data from bookmark-ed documents and indexes and classifies the documents. In one embodiment, the present invention utilizes a proxy server to observe a user's access patterns to provide useful personalized services, such as automated URL bookmark, document refresh, and bookmark expiration. A subscription service which retrieves new or updated documents of user-specified interests is also provided.

That patent relates to document indexing, not information sharing or interactivity between users. Although our virtual community can store statistical information about web resources, they are different domains.

US patent application 20040043818 by Willis, Daniel (Mar. 4, 2004) disclosed a "system and method for interactive on-line gaming", which includes customer located equipment and a gaming service provider and a method for providing an interactive gaming system service is disclosed, which includes the steps of connecting customer located equipment and a gaming service provider through a broadband access network, establishing a connection between the gaming console and the service provider through the ultra-thin client, and controlling events taking place on the gaming console according to messages sent to and received from the gaming service provider.

That method is one method used in current online games which are client server based. Although our method is also applicable to online gaming as online gaming is also a type of web resource, the scope of our method is beyond any game but to the whole Internet.

U.S. Pat. No. 6,684,212 by Day, et al. (Jan. 27, 2004) disclosed a "System and method for data sharing between members of diverse organizations". A system and method is adapted to utilize the Internet as a medium for providing information and data management and sharing of data between diverse project team members. The project team members may be part of diverse functional organizations within one or more larger organizations, may be geographically separated, or may utilize differing information management tools to perform their work activities. Each team may have its own organization separate from the organization from which the team members are drawn. Moreover, the information and data may be financial, technical, marketing and the like.

US patent application 20030216986 (Nov. 20, 2003) by Hassan, Adnan entitled "System and method for information exchange" relates to a method for information exchange allowing a first entity to post a project plan with the project plan requiring one or more inputs from other entities. One or more entities may then respond to the posting, offering to fulfill one or more of the inputs. Subsequently, the first entity may review the responses from the one or more entities to select the inputs necessary for the project.

The above two ideas focus collaboration among project members, which differ from our method in that our community are composed by anybody in the Internet. Any users in the world can post anything to share with other users in the same community.

U.S. Pat. No. 6,729,885 by Stuppy, et al. (May 4, 2004) talks about a "Learning system and method for engaging in concurrent interactive and non-interactive learning sessions" which has an instruction material controller configured to provide instructional material used for creating learning sessions. A teacher station and a plurality of student stations are used for holding learning sessions. The teacher station selects a learning session to be either an interactive learning session where a teacher interacts with the student on a shared basis or a non-interactive learning session where the student works independently of the teacher. According to one feature of the invention, at least one interactive learning session and at least one non-interactive learning session are created for the plurality of student workstations.

U.S. Pat. No. 6,611,822 by Beams, et al. on Aug. 26, 2003 entitled "System method and article of manufacture for creating collaborative application sharing" disclosed a system that provides a goal based learning system utilizing a rule based expert training system to provide a cognitive educational experience. The system provides the user with a simulated environment that presents a training opportunity to understand and solve optimally. The technique establishes a collaborative training session, including the steps of establishing a network connection between a plurality of users, selecting a mode for the network connection between the plurality of users, establishing a network connection mode between the plurality of users, and synchronizing the mode between the plurality of users. Modes of operation include application sharing, white-boarding, media sharing, newsgroup information sharing, chat room initiation and discussion group initiation.

The above two patents discuss data sharing for teaching/training systems. It is variation of online school, on line training and meeting. In the first learning system, teacher's machine and student's workstations serve different purpose, and in second invention, there is an expert training system. Although our system can provide helps among each other, there are no such goals for our virtual community.

U.S. Pat. No. 6,629,100 by Morris, et al. on Sep. 30, 2003 talks about a "Network-based photo-sharing architecture for search and delivery of private images and metadata". A method for executing searches for resources that span more than one private resource repository in a restricted-access resource sharing system is disclosed. The system includes at least one server node and multiple peer nodes connected to a network. Resources, such as data digital images, may be retrieved from the nodes based by issuing queries containing terms matching the metadata associated with the resources. The method includes maintaining storage of resources and associated metadata on respective peer nodes, wherein the associated metadata is based on at least one metadata vocabulary. Each of the peer nodes is allowed to indicate to the server that the metadata vocabularies associated with the resources are designated as private, thereby becoming a restricted access peer node. It provides some level of privacy in search queries by specified metadata vocabularies or respective restricted access peer nodes.

That patent is about phone sharing using metadata. Photos, or images in the network, is an web resource, so our system and method can setup virtual communities based on those resources. Metadata or privacy are not our focus.

U.S. Pat. No. 6,219,045 by Leahy, et al. (Apr. 17, 2001) of "Scalable virtual world chat client-server system" provides a highly scalable architecture for a three-dimensional graphical, multi-user, interactive virtual world system. A plurality of users can interact in the three-dimensional, computer-generated graphical space where each user executes a client process to view a virtual world from the perspective of that user.

In our system, the use of 3D is not required.

U.S. Pat. No. 6,212,548 by DeSimone, et al. on Apr. 3, 2001 disclosed a "System and method for multiple asynchronous text chat conversations". A plurality of users communicate in a plurality of real-time text conversations (e.g., "chat sessions") in a client-server message processing environment using messages including a conversation index, a conversation-initiator ID and a list of message recipients. Each conversation is maintained at client terminals in an individual window. Dropping and controlled adding of conversation participants is attended by message updates to other participants. Alternative peer-to-peer message handling reduces the processing burden on servers while allowing clients to perform control and display functions. Voice or other non-text messages are also communicated using described techniques.

That patent focuses on process of conducting multiple chatting sessions once users join the on-line chat. This invention focuses on the collaboration and setup of a virtual community by means of common resource usage browsing, programming, using software and others. Once the individuals are in the community, private chatting can be conducting by any means, including the means in that patent or other patents.

U.S. Pat. No. 6,640,241 (Oct. 28, 2003) by Ozzie, et al. entitled "Method and apparatus for activity-based collaboration by a computer system equipped with a communications manager" uses "a communications manager" provides communication services for an activity-based collaboration system, in which data change requests comprising deltas are communicated over a network between network-capable devices. The communications manager is operable on a local network capable device for sending locally-generated deltas over the network to at least one remote network-capable device and for receiving remotely-generated deltas over the network from the at least one remote network-capable device.

Although our system can be viewed as a global collaboration system, it does not directly discuss delta data transfers.

In U.S. Pat. No. 6,148,328 by Cuomo, et al. on Nov. 14, 2000 entitled "Method and system for signaling presence of users in a networked environment", Dynamic information is unobtrusively provided to a target user about other users in an online environment. The target user is informed of the arrival and departure from the environment of particular selected users. Additionally, an indication of an aggregate number of users in the environment is given to the target user. In that patent, there is need to generate online and offline notification and audio signals for each users while that is not a requirement for our system.

That patent discusses user notification as used in many instant messaging. Our system and method focus on the virtual community. Once in the virtual community, any users can view comments or activities from others, or read statistical information. They can also conduct any online community activities such as notification, messaging without limits.

U.S. Pat. No. 6,571,234 by Knight, et al. (May 27, 2003) titled "System and method for managing online message board". Queries and postings made to an online electronic message board are managed by a number of community and customized software search robots. The robots interact with subscribers to access, retrieve and post messages according to content groupings and classifications that reflect the collective shared interests, desires, etc., of such subscribers. Because the information is already preclassified and indexed in such fashion, subscribers are given rapid access to key information that is most of interest to them, enhancing their overall experience with the system.

That patent talks about the use of search robot on message board. Although our virtual community can use message board for users to exchange information, the actual method used for message board is not confined to a particular method.

U.S. Pat. No. 6,408,309 (Jun. 18, 2002) by Agarwal talks about a "method and system for creating an interactive virtual community of famous people", or those people who wish to attain the status of a famous person, in a field of endeavor, such as arts, accounting, animal rights, business, education, engineering, entertainment, financing, government affairs, human rights, legal, medical, philanthropy, politics, religion, research, science, sports, etc. The virtual community of the present invention is unique in that the members of the virtual community can update, modify or revise their individual profile, and interact with other members of the virtual community, as well as the non-members of the virtual community.

That patent is one particular type of virtual community about famous people. It differs from our invention in that topics of our virtual community are based on resource people are accessing.

US patent application 20030149681 by Frees, Lewis; et al. on Aug. 7, 2003 disclosed a "Distributed system for interactive collaboration" that can facilitate synchronous and asynchronous communications, take advantage of electronic scheduling tools, support a facilitator paradigm, and store meeting communications for later retrieval. The system can create a collaborative environment for members of a team in communication with a computer network. An interactive forum can be provided in the collaborative environment in a manner offering varying degrees of structure for collecting information from the members of the team. The information can then be used to arrive at a collaboratively derived decision.

That patent application relates to online meeting and is also one particular type of online service.

U.S. Pat. No. 6,161,149 (Dec. 12, 2000) by Achacoso, et al. disclosed a "Centrifugal communication and collaboration method" for communicating information among members of a distributed discussion group having peripheral communication devices involves communication between the peripheral communication devices and a central agent.

That method defined some messages and replies for sending by central agents but does not consider the ability of forming the virtual community based on resource usage.

US patent application 20040073691 Sun, Chen on Apr. 15, 2004 talks about "Individuals' URL identity exchange and communications". The URL has individual's information privacy control, exchangeable data, and spam-resistant communications channel. Exchange websites can use such individuals' representations, examples being contacts management system, eCommerce exchange systems, matchmaking services and discussion forums. Branding assessments result from using the system. This URL identity can be used in the virtual community once the user joins the community automatically.

Even though URL identity can be used in virtual community, that patent application is not about the formation of virtual community.

US patent application 20030060910 (Mar. 3, 2003) by Williams, David B.; et al. disclosed a "Method and system for creating a collaborative work over a digital network". The plurality of participants receive segment instructions for authoring the segment candidates. The candidates are submitted to the system and at least a subset of the submitted segment candidates are distributed to a voting audience over the computer network. In response the system receives votes for a favored segment candidate from the voting audience.

This method reflects the typical collaboration process but does not apply to the dynamic nature of membership in our virtual community.

In US patent application 20040003352 by Bargeron, David M.; et al. on Jan. 1, 2004 titled "Notification of activity around documents", Users are able to subscribe to notifications regarding to activity around particular documents (e.g., changes to and/or annotations to the documents). A variety of different notification parameters can be set by the users, allowing them to request the type(s) of notifications they would like to receive, as well as how frequently notifications are to be received.

That method is still the typical subscription model in that users can be notified for notifications on document change or update event. It is different from our virtual community system.

In US Patent application 20020143691 (Oct. 3, 2002) by Ramaley, Alan; et al. is about "Automating a document review cycle", an automated review cycle automatically merges changes in a reviewed document into an original document and by provides reviewing tools on a context-sensitive basis. The automated review cycle can operate within the environments of a document management system, a link-based document collaboration system (e.g., common server), or an attachment-based collaboration system. By generating a review cycle identification number (RCID) and by maintaining other information about the review cycle in a configuration file, an original author and a reviewer of a document can be distinguished and can be provided the appropriate prompts and tools to facilitate the document review process.

That method is on automating document reviewing cycles, not based on virtual community.

In U.S. Pat. No. 6,629,129 by Bookspan, et al. (Sep. 30, 2003) "Shared virtual meeting services among computer applications", A method and system for controlling the interaction between a primary application and a virtual meeting application and assigning the responsibility between them for providing user interface components is provided. The virtual meeting application provides the functionality for a virtual meeting and provides user interface components related to transient state changes in the virtual meeting.

That patent focuses on the software interaction between one primary application and meeting application. Virtual meeting also differs from our virtual community in that virtual community has wider scope.

US patent application 20020083134 by Bauer, Kirk Wayne JR.; et al. on Jun. 27, 2002 entitled "Method and system of collaborative browsing" disclosed A dynamic collaborative-browsing system enables client programs connected to a computer network to join and leave groups or sessions, to collaboratively browse together as a session, to communicate with other client programs in the session. One or more client programs interact with the server software to cause the server to create a session, to cause the client program to connect to a network site, to notify the server software of the network site's location or URL, and to notify other client programs in the session of the network site's location or URL so that other client programs in the session become connected to the same network site.

In that patent users can join and leave groups and there is coordination between clients. However, the main difference between that invention and ours is that in our method, any resource in Internet is a virtual community and any user browsing that resource automatically becomes a member of the community.

In the latest Internet Explorer, Microsoft has built web discussion service in the browser which works with Microsoft's share point portal server to allow collaboration within the server. Web discussion is part of Microsoft's Office Online Collaboration and also part of Microsoft Office 2000 and Internet Explorer 5. Discussion servers are part of Windows server 2003 suite also. Generally, it is another type of traditional discussion forum for Intranet and office use.

However, there are several differences between our invention and Microsoft's solution. First, it only allows discussion, while our virtual community can do much more than discussions; Second, to use web discussion, users have to subscribe to a particular discussion server first and a server administrator must set up this feature and enable the share point team service before users can use it; Third, it is used as a closed system for particular groups of documents or web sites. Discussions are not available to everyone who visits web pages automatically.

Wiki is another form of user interaction in the Internet. Wiki is unusual among group communication mechanisms in that it allows the organization of contributions to be edited in addition to the content itself. Allowing daily users to create and edit any page in a Web site is exciting in that it encourages democratic use of the Web and promotes content composition by non-technical users.

However, it requires a special piece of server software in the web servers that allows users to freely create and edit Web page content using any Web browser. Its purpose is for "open editing"—web page creation and updating instead of user interactions.

There is also weblog, or blog, the Internet diary, which is a web site, where people can write stuff on an ongoing basis. When new stuff shows up at the top, visitors can read what's new, then they comment on it or other web sites or link to it or email to the author. A blog gives everyones their own voice on the web. It's a place to collect and share things that people find interesting whether it's your political commentary, a personal diary, or links to web sites that people want to remember.

The difference between our invention and blog is obvious in that even one does not write anything, he is still part of the community of all resources he has access to and can participate all activities in the community.

This invention is somewhat similar to my other U.S. Pat. No. 6,418,462, entitled "Global sideband service distributed computing method", in which all clients connecting to a central web server are grouped together to form a sort of super computer by a sideband channel.

BACKGROUND OF INVENTION

With the fast development of Internet at the end of last century, web has gradually becomes the mainstream for people to access information. Billions of people are using all different ways to go online such as by dial-up modem, DSL, T1, or cable modem. Various devices connecting to the Internet range from server computers, desktop PCs to mobile and embedded devices. Internet is now accessible almost anywhere, at anytime.

With the widespread of Internet and e-business, millions of companies and organizations have set up their own web servers and make it accessible to the public. There are also many search engines such as Yahoo, MSN or Google for the general public to search for information. Most contents in the Internet are HTML pages and accessed through HTTP protocols.

The majority usage of those web servers, including many online stores, is to provide one-way information from service providers to users, either casual readers or customers. Sometimes, servers interact with clients by means of survey forms, comments, discussion groups, category and production selection, and online payments. Those are two way communications between servers and clients; however, there are few web services that can provide interactions or collaborations among the users themselves.

Outside web servers, in the Internet, there are many other ways of for user interactions such as traditional bulletin board, the Usenet, on line chat (IRC) or even on line games. Recently instant messaging also joins this category. These services are typically dedicated to user interaction. Some are non-real time, some are real time. For example, online forums, bulletin boards or discussion groups allow users to share information, ask questions and get helps by posting threads. On-line chats, IRC or instant messengers allow instant communications among peoples.

A recent trend of those interaction services is to take the form of web sites by hosting them into web servers so people can use those services with a browser. Such as web chat, web discussion, collaboration service, or online communities. With those services, people can interact with other people when they browsed into those particular web servers such as some web portals.

However, there are still big gaps between the web and the users. Which is: the majority web users who access information in the Internet cannot interact with each other. There are no universal solutions to connect the community of users who access the majority information in the Internet.

From user's perspective, traditional web browsing or surfing the web is a solitary experience. The user digs into the web and searches for information, then the web site returns information. There is little or none interaction to other users who also accesses the same information. Even users can communicate to each other through online chat, instant messenger, these tools or services are segregated from the main web sites where the users are browsing. Communication between users is completely independent of users' browsing experience.

While there are several approaches to integrate chatting into web pages, no one can fully resolve the following problems. For example, there is no correlation between the information being accessed and the people who access the information; it is hard to connect those users even when they are making the same activities. Some web sites provide ways for users to review news or movies, send comments on some topics, enter discussion groups or forums from web pages, start online chat applets from within web pages, or even run instant messenger with a click of mouse. However, people are still forced to switch from one program to another or go change from one web page to another while they are browsing and chatting at the same time.

This invention, which changes people's navigation paradigm, is aiming at those inefficiencies in a way that try to resolve all those problems. It gives user the ability to communicate with others seamlessly when they are accessing information or using software. For example, interest matching, getting helps, finding reviews, or conducting any community activities that are not supported.

This invention originates to my other patent titled "Global sideband service distributed computing method" (U.S. Pat. No. 6,418,462) in 1998, users of one shared resource are organized in a cooperative way. They share some similarity if we view that providing dynamic information about the web page as a sideband service in addition to the main browsing service.

Later in 2000, when I started to provide software being used directly in the web, there is need to provide customer support for many users since many people do not know where to get help. Sharing the knowledge between users became my first idea. Traditional way of providing a discussion forum does not work well as people are lazy enough or un-reluctant to search for help, what they want is immediate feedback and helps. So came across the idea of letting people who are using the same software to form communities and can help each other, with the help of an extra software module. This is also another type of resource based virtual communities.

SUMMARY OF INVENTION

This invention disclosed system and methods for resource based virtual communities. Instead of user or topic oriented, the community is resource based. Any resources that can be shared or used by multiple people, including Internet web sites, web pages, individual software, network software or any other resource can be based. The community is composed at real time of all users who are accessing the resource, or who has accessed the resource or who will access the resource.

Any resource in the Internet can be identified by URL (Universal Resource Locator). All web sites and web pages can be uniquely identified and accessed using the URL. There are different resources in the net, such as web pages, email addresses, web services, ftp resources. Other resources are not typically represented by URL such as software because normally they are only used on personal computers and not directly accessible from Internet. However, those resources can still be expressed in customized URL, such as resources in Intranet or software. For example, a software A can be identified as software://A. Regardless how to express them, they are still accessible resources.

Many times, people who use or access the same resource share many things in common. For example, those who browse the same web site most likely have same or similar interest; those who use the same software may suffer from the same software bug; or having problems getting familiar with the software; those who read the same technical paper may work on the same industry or field; those who comment on the same news may have the same political orientations.

Those similarities among users who access the same resources and resource creators or maintainers such as web page authors or software creators are the basis for the virtual community based on this resource. All users who access the same resource form a virtual community for that resource. So, when a user starts use the resources everyday, either browsing the web or using the software, from time to time, the user automatically becomes the member of many virtual communities for the resources that he has accessed. Once in the community, he can enjoy the benefits of the communities such as helps on the topic, collaboration with others in the community or contribution to the community.

During this process, people from all over the world who does not know each other are then linked together because they are accessing the same resource. The resource based virtual communities provide effective communication and collaborations for their members all over the world and can even enable real time communications for them to know each other, exchange information, or any activities they choose. For example, when a new user joins the community or leaves the community, all current community members can be notified through its their connection with the community.

The virtual communities can also server as another purpose: providing their members useful feedbacks, comments, reviews and references. Traditionally, when a person looks up information in the Internet, he has to rely on search engines to find out the needed resource because Internet is too huge for one person to grasp all its content. With the virtual community for that resource, he can know more information about the resource—how others view the resource, whether the resource is useful or relevant. This is similar to the traditional consumer report or various online reviews in many web sites but there are significant differences.

Traditional online reviews such as movie reviews, book reviews, broker recommendations or ratings suffer from the same drawbacks. One is that they are scattered around different places or web sites in the Internet and people have to search in various web sites to find out useful information. Another is that only view few resources come with systematic reviews, comments or ratings. The majority resources in the Internet do not provides feedbacks among their readers. It is not that people do not want such interactivities, it is simply that setting up the interactive review, rating or discussion system for each web site is too complicated and costly for the resource creators.

Furthermore, if those interactive review or rating features are set up by resource creators, sometimes, they might be monitored and biased by the system manager. For example, an online sales web site might easily delete those negative reviews or comments for its product since they have full control over the system to mislead other users. Another well-known misled information for web sites is the faked page hit count to indicate its popularity which may not be the truth. While in our system, since virtual community is maintained by our central servers independent of each resource, there will be no such censorship or misled information.

In our system and method, we provide all people who have accessed, are accessing, or will access the resource the ability to collaborate together. The resource is not limited to a specific web site, chat channel or discussion thread, it can be anything from web sites or every web page in the Internet to every links in the web page.

Once all people who access the resource compose the virtual community based on the resource, they can participate many community activities such as making comments, publishing reviews, rating the resource, writing notes, sending messages, sharing whiteboard, or chatting with others or even the whole community. Community members can also help each other, asking for questions and replying answers, exchanging ideas or sending instant messages. They can also make interests matching, schedule meetings, or even dating. Furthermore, community members can also extend the community by creating new activities not in the existing system. It is also possible to communicate and interact with other virtual communities or people outside this system.

In our system, at the same time users are using the web resource, such as browsing the web site or reading the web page, they are able to see the statistical information of the resource that is changing all the time. The statistical information includes: hit counts, comments, ratings, reviews, or any other information that can help new users to decide the usefulness or effectiveness of the resource. Those information can be presented to user through a separate channel in a separate window, popup dialog or other means that enhance users' resource using experience.

In general, resources can be divided into 2 categories: web resources directly accessible in the Internet using web browsers and those are not directly accessible from within browsers.

For most web resources, users will use browsers to access the information, and thus our invention will provide 4 methods to connect to virtual community based on the resources while users are browsing those Internet resources. For other resources that are not directly accessible from the browsers, another 2 methods are provided to access the virtual community based on those resources.

The first method is to use a special web gateway or proxy server in users' browsers. This is similar to how corporations set their web access gateway. All users' browsers will go first to the proxy server before connecting to the destination. The proxy server will then forward the request to the destination resource and return results back. In addition, the proxy server can automatically join the virtual community based on the new resource he just visited; it can also return virtual community information to the users as well. This method does not need to install any software on the users browser side and can be transparent to the users. The only drawback is that sometimes, the users may be reluctant to use external proxy servers to handle sensitive e-business in the Internet.

The second method is to install a custom toolbar button or context menu on user's browser so that whenever the user starts to browse any web resource, he is able to enter the virtual community with a click of those button or menu. This is easy for users to control when they want to join or view the virtual community based on the web resource they are accessing. But there are extra steps for users to initiate the actions to enter the virtual community.

The third method is to install a standalone application or special software driver or agent to monitor and filter the web request from web browsers and then for each web request, automatically lookup the virtual community for that resource, sign up user and then connect to the virtual communities based on resources that user has accessed or is accessing. In the extreme, the standalone software agent can itself be a customized browser. The drawback for this method is that some users may still want to stick to their favorite browsers or may not start the additional software all the time.

The fourth method is to use some sort of additional browser component, plugin, browser helper object, or script that can integrate with users' existing web browsers. With the help of the plugin object, all users' browsing activities will be accompanied by a separate connection to the virtual community based on the currently accessed web resource, signing up and retrieving the current information of the virtual communities. In many cases, browser plugin object can be automatically installed without user intervening.

In all the above cases, the additional software (either in user's computer or a separate server side) will be responsible to talk to the virtual community servers based on the web resource current user is accessing. It can present to users all related virtual community information such as comments from previous users, total hit count and users' rating for that web resource. Through this software, any user can then participate to the activities of the virtual community such as adding his own comment for the resource, replying to others' comments, asking and answering questions to others or community. Users in the same community can also send private instant messages or conduct other activities if they choose to.

For resources that are not directly accessible by browsers such as software, online games or other common resource.

This system can use the following methods 5 and 6 to connect users based on the same resource usage.

For some resource that not accessed using browser but can be accessed individually in user's computer, such as software, there is the fifth method for each individual software we can attach the software with a special component, shared object, dynamic library or extension to that software that will allow users to connect to the virtual community for that specific software as soon as users start to use the software and sign out from the virtual community when the software is terminated. In this way, as soon as the software is used by this person, there is part of the virtual community for that software and can get immediate help from others who are also using the same software at the same time. The software extension can be generic for almost all kinds of software as long as it can be started and running along with the software itself.

For other non-software resource, there is the sixth method users can use to connect to the virtual community based on the resource name, i.e. either using browser, or special software to connect to the pre-defined virtual community servers by selecting the resource identifier directly or search the resource by names. This way, people can connect to the virtual community as long as they have the resource identifier. And this method works for all kinds of resources.

To protect users privacy, when using the above system and methods, users can choose whether to automatically login; whether signup anonymously or using custom login name; how much he will be involved and participate in the virtual community. For example, he may choose not to publish his identify or signup anonymously, thus others will only see the statistical information such as web resource usages but cannot know his true name. The user's privacy is effectively protected. For those who want to be contacted even after they accessed the resource, or those who actively involve in the community, they may choose to publish their usernames so others can contact them by sending messages to them even after they finished using the resource.

Any users can be uniquely identified by across multiple virtual communities since they are all managed by the same system. A user can be identified by its username, email address, IP address or other means. Those who love to make friends can also publish their interest on the community so the system can make interest match as well. When users add their comments for the resource, for example, they can choose to be notified when others leave some messages, or they can allow others to send messages to them as well.

The virtual communities are supported by the universal virtual community server, or a group of servers. The universal virtual community server composes individual virtual community areas, or sub-servers that host the resource usage and current user information for every resource in the Internet or in the world. Identified by its URL, every resource is uniquely mapped to one virtual community sub server through mapping. The universal virtual community server is accessed by plugin or special agent in the above methods to search and find the corresponding virtual community by the resource URL the user is accessing. A global user database is responsible for maintaining all Internet users' information and status. Individual virtual community area or sub-server for any resource can be created on demand when the first person is accessing the resource through any of the above methods. After that, all future users of the resource will visit the same virtual community and can be automatically put to the virtual community when they access the same resource.

DETAILED DESCRIPTION

Figure 1:
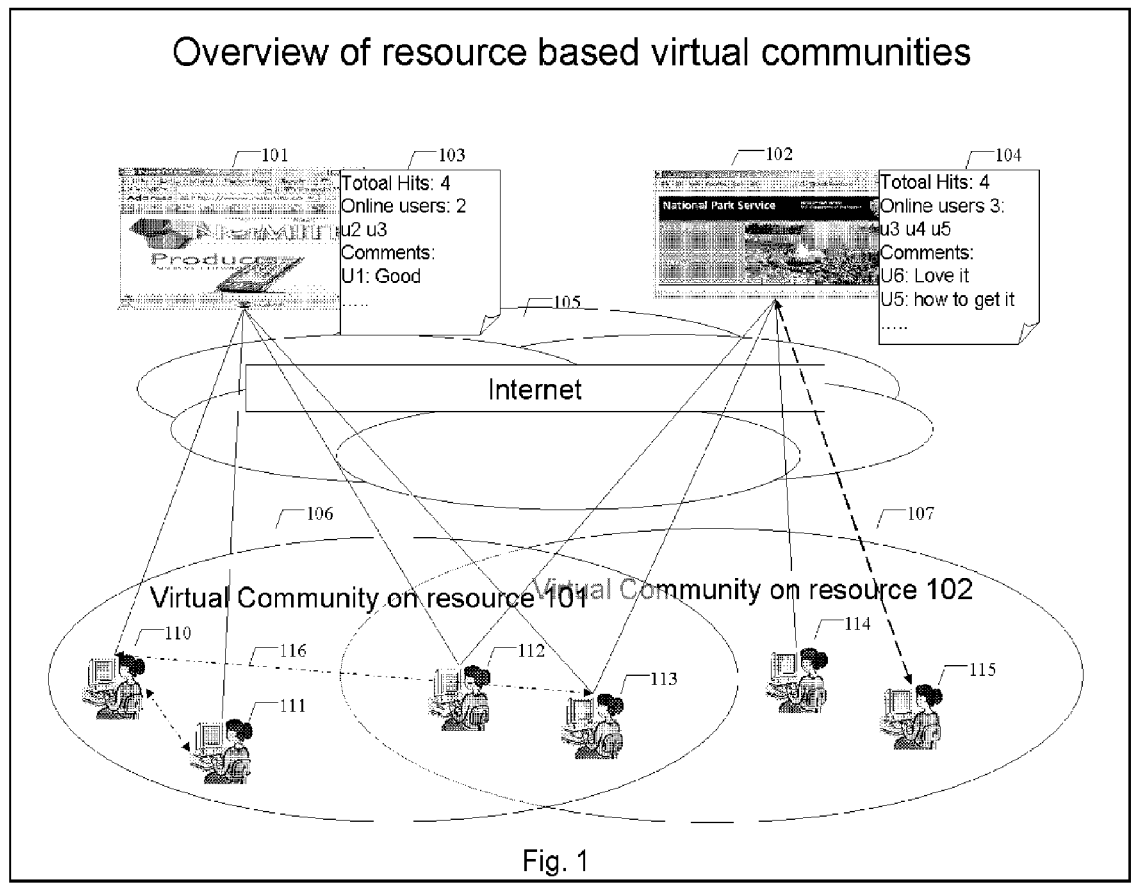
FIG. 1 is a perspective overview of the resource based virtual communities.

FIG. 1 is a perspective view of resource based virtual communities. In the picture, the resources are two web pages and community is composed of all users who are accessing the web pages.

Community, by definition, is a group of people who share something in common such as those who live in the same location, those who have same interests or those who had same experience, like working at the same company. In the past, community members have to communicate to each other face to face or by mails. With recent development of Internet, communities also go on line. For example, communities can be composed of people far away from the world and they can communicate to each other by email, mail listing, bulletin board, or the web. There are also some virtual communities in the web portals where people can exchange ideas using browsers. Usenet, IRC chat channels and recent P2P services such as Napster can also be viewed as different types of community in Internet.

All of those communities share two common things: one is that community members share the same interests and the other is that the community memberships are relative fixed. When new members want to join the community they must first register or subscribe from the community web site. Even in some P2P services where there is no central servers, subscription is still needed. Although people can unsubscribe to the community, normally, the memberships are relatively fixed where people have to logon to each individual community manually and before they can searching news, talking with others in the community.

However, in this invention, since virtual community is based on current users who access the same resource, memberships of the users are far more dynamic. In one minute, a user who read the first web page belongs to the first community, while in the next minute when he switch to the second web page, he becomes part of the other community based on the second resource. During this process, there is no need for the user to register himself for each new community he enters when he access a different resource. The system and methods can automatically connect him to the corresponding communities based on the resource he is accessing, even without explicit login.

Of course, if he wants to protect his privacy, he can choose to connect anonymously or invisibly. The user can provide login info if he choose to be recognized by the username he choose. Anyway, the dynamic nature for such resource based virtual communities give users new chances to know others who are also accessing the same resource. He can immediately know how many other people are also using the same resource and can talk to them, exchange ideas, share opinion or conduct any other community activities.

In FIG. 1, (105) is the Internet. We show two resources and how virtual communities are formed upon them. For illustration purpose, (101) is a popular web news site, but it can be any web resource or even one web page. (102) represents another web resource—a national parks' website. There are users who are accessing the news page or the parks page. User (110) and user (111) are accessing the news page (101) only, user (112) and user (113) are accessing both the news page (101) and the parks page (102) at the same time, while user (114) and user (115) are only accessing the parks page (102).

In this picture, there are two virtual communities formed automatically upon those two resources—virtual community (106) composes of those who are accessing news page (101) and virtual community (107) composes of those who are accessing the parks page (102). For those people (112, 113) who are accessing both pages, they belong to both virtual communities at the same time.

It is important to know that as people are visiting resources from time to time, they belong to all of those virtual communities. However, not all the people have the interest or time to keep track of all those virtual resources and communities, so our system and methods will help the users to do the task—automatically sign up each virtual community associated with each resource users access and sign off when they close the resource. Anyway, to most users, the current resources they are visiting are the most important and ability to connect to the other users of current resource is more valuable. If requested, the system can also remember all virtual communities that the user has visited also.

Once in the virtual community, members can do anything that community server supports as a traditional community such as accessing bulletin boards, chatting, exchanging ideas, asking and providing helps, or other collaborating activities. In addition, the virtual community server can keep track of statistical information regarding that resource like hit counts, current online users, users' ratings or comments about each resource (part of 103, 104). This information can be accessible to community members when they join the community or when they access the resource (101,102). In addition, community may allow users to access the comments from previous and future users by providing some sort of message board so everyone can express his opinion or share his ideas.

Each community may organize its information, contents or services in hierarchy, hypertext or web format so that users can explore them virtual communities by following links or directly browsing. That web page enables its members to explore the community. In addition to include the community information, it acts as an entry to more advanced feature for the community. For example, it may contain its own links that allows users to send or receive messages. The community page can be send to the users when they start to use the resource so they can know about others' advice or how many other users in the world are also accessing or have accessed the resources. In this example the community page (103) for news page (101) can be presented to user (110) (111) (112) (113) while community page (104) can be send to users (112) (113) (114) (115). People can use that kind of information as guidelines for web surfing.

The community page can be a separate window, or popup window in the users' browser or embedded in the users. It is to enhance user's regular resource using experience. In any cases, once the users become part of the virtual community, they can explore the communicate page similar to access any normal web pages. They can find ways to connect to other members of the community. For example, user (110) can start chat with user (113) through separate channel (116) when they are both on-line. User (110) can also chat with another user (111) simultaneously. He can also leave a message for those who have accessed the resource before left his contact id in the community but not currently online. The possibility in the virtual community is enormous.

Figure 2:
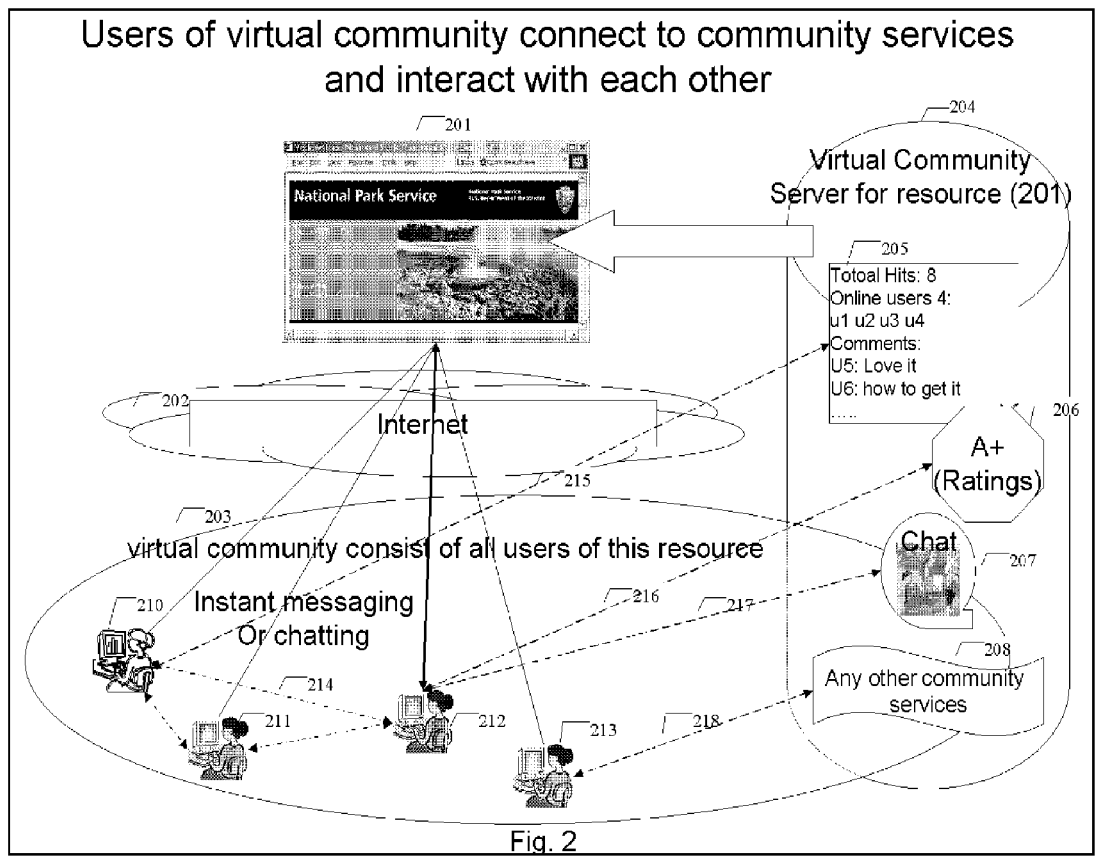
FIG. 2 shows how users in the same virtual community based on the same resource can connect to community services; communicate and interact with each other.

FIG. 2 shows how users in the virtual community based on the same resource interact with the community. Community members can review resource usage, write comments or notes, rate resource, deliver email to others, send instant messages or even voice chat in real time. There are various ways that members in virtual community can communicate to each other or with the community or resource itself.

In FIG. 2, the community based on a web resource (201) is shown as (203). Current users in the community from all over the world are represented as (210), (211), (212) and (213) since they are accessing the same resource—web page (201) through Internet (202). As virtual community members, they can access all services or resources in the virtual community server, as shown in (204). Some sample services may include—statistical information about the resource being accessed and bulletin board (205), ratings for that resource (206), chatting room (207). All other community services not covered are shown as (208).

In this picture, when user (210) is reading the web resource (201), he is now in the community (203). He can access the current status (205) of community for this web resource through a separate channel (215). The current status (205) may include current dynamic information about the resource, such as total hit count=8, current online users=4. It may also list all current visible users (in addition to anonymous users) as u1, u2 u3 or u4. In addition, other users, such as u5, u6, might have left their comments or messages as a bulletin board. Members can be identified as unique IDs that others can reply to their comments, or even send them private messages, or chat with them. The IDs can be generated automatically or anonymously to protect their privacies but can also be user assigned. Users can be reached by the same identity among all the virtual communities so he can receive messages or be reached from people of another virtual community even after he has finished accessing the resource of the other virtual community.

To access any services, users have to connect to the community server (204) through additional connections other than his connection to the resource. For example, user (212) can send his rating for resource (201) to the rating service (206) through connection (216) if he feels that web resource is extremely useful or useless. He may also connect to the chatting room (207) through channel (217), where he can chat with others, broadcast his questions and hope to get responses immediately.

Members of the communities can conduct other kind of collaborating activities either within our system or outside the system. For example, once users (210), (211) and (212) get to know each other, they can schedule a meeting or road sharing by chatting or instant messages directly. The chatting or instant messenger can be provided by other systems.

This kind of collaboration among resource users are not possible in the past since each individual visitor to the resource is not aware of any other visitor's existence without this system. The traditional bulletin board or discussion forums allows user interaction but can only be used separately. Only a small handful of people know where to get those web sites, or are willing to register to access those services. Many people who just visit this web page does not have the time or interest to find related discussion forum by themselves. However, with our system, the community and services are automatically present to users when he starts to access the resource and users are much easier and more reluctant to use.

All community services can be accessed simultaneously and independently. For example, user (213) can access other community services (208) through connection (218). Those services can provide additional features to the community members. For example, allowing users to connect in real time with the webmaster or the author; matching people based on their interests; on-line auction for that resource; or scheduling on-line conference for the resource very useful for scientific paper reviews.

All those additional services use separate connections (215) (216) (217) (218) from users to the community servers at the same time when users are accessing the resource (201). Of course, once a user has joined the community, he is also able to visit the resource while he is not accessing the resource. Because there are so many virtual communities in the world—one per resource, accessing the resource is just one type of criteria to select communities for each individual. This is the most natural choice based on users' own behavior—browsing, or using of resources.

Automatically making the user part of the community for the resource when the user accesses the resource gives the user at least two things that traditional web surfing cannot provide: One is the choice to get in touch with others who have similar interests, and the other is to know more out of the resource itself, such as usage count, feedbacks from others. The virtual community and services are provided to help or enhance users' browsing experience instead of interrupting or annoying them.

Figure 3:
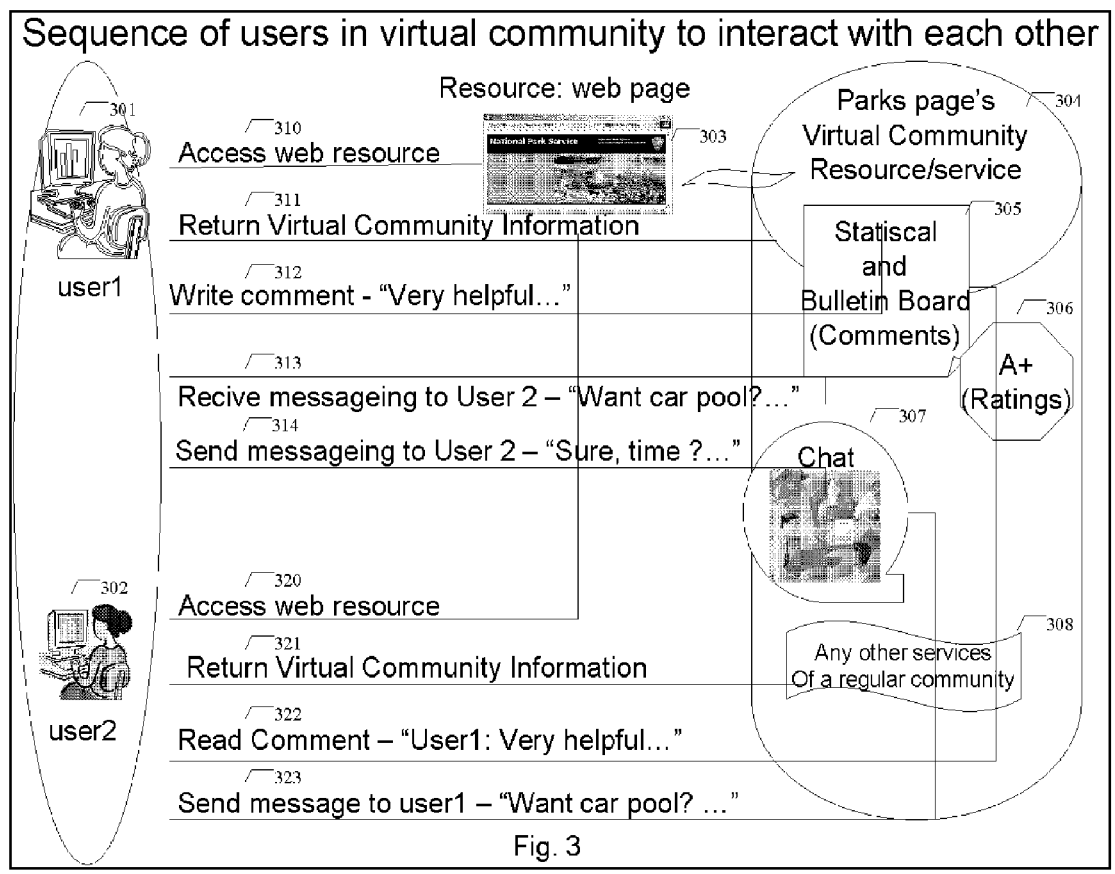
FIG. 3 illustrates the sequence for users to interact with the community and to other members.

Since member interactivity is one major feature in the virtual community, FIG. 3 illustrates the sequence for a user to interact with the community and other members. It shows how the user (301) can get comments of the web page he is reading and how to start chatting with another user (302) who is also reading the web page somewhere else in the world.

In FIG. 3, first user (301) is accessing a web page resource—parks page (303) by normal http connection (310) using web browser. Once the web page is viewed, he becomes a member of the virtual community (304) for that web page and the current information of the virtual community (304) is returned to him through (311). To recommend this site to others, he writes some comments (312) to the bulletin board (305) of the virtual community.

When second user (302) is on-line and also accesses the same web resource (303), the web page (303) is retrieved by browsers through connection (320). Now she is also part of the virtual community (304). She can retrieve the current community information through (321) and receive the comments left by the first user (322) about his recommendation. The point is that she can read reviews for the resource in the community easily. Otherwise, without the virtual community, she has to spend lots of time to find those reviews. Meanwhile, when the second user (302) find that the first user is also currently online, she (302) can send an instant message (323) to the first user (301) about car sharing through the chatting service (307) of the virtual community.

As long as the first user (301) is online, the messages will be immediately delivered to him by the chatting service (307) of the virtual community. So he can read the message (313) from the second user (302) and sends back his response to confirm the time as (314). The virtual community system is responsible to remember each user's identity not only in this virtual community server, but in all the resource based virtual communities. The reason is that, even a user finished using this resource or moved out from this web page and moved to another resource, or web pages, the system can still reach him if there is any message delivered from the first virtual community. Even he is not on-line at the time, the system will cache the message and deliver to him next time he is online. Similar to cookies, user can have the options to turn off this feature in order to protect his privacy.

In this scenario, before two members can communicate, there is no need for them to know each other, which are required by most instant messenger services. There is also no need for them to first browse and login to a specific discussion forum or chat rooms to post messages—system automatically put him into the community as he visited the resource. They just need to visit the same resource—web page in this example, or any other common resources, they are able to exchange ideas, make friends and collaborate in our virtual community system.

Virtual community servers temporarily save messages sent to the user if he's not on line at the time. Although virtual communities are resource based, different virtual community servers based on different resources can still share the same user information. The virtual communities users can be managed by a centralized user server which can be accessed by virtual community servers. This can be implementation dependent but the consequences is that same user regardless which resource he is accessing, thus which virtual community he is in, can still receive all messages from people from other virtual communities. The messages from other virtual communities will be buffered and delivered to him the next time he is online—accessing the same web resource is no longer necessary once the system already knows his identity—either machines' IP address, username, email address, cookies or any other identity user may choose.

Virtual communities can provide services such as friends-making, interests matching, or some other campaign such as marketing or advertisement. People who visited the same web resource definitely have already shared something in common—that is, they are using the same resource—and they might have similar interests as well, and if they are all on line at the same time, it is much better chance that they can share some common thoughts and hence there are much more possibility to find matched persons from all people in the world. For example, the system can match users who have accessed exact at least 5 or more same resources and send them the matching results. This is so hard to achieve with regular on line dating services. Virtual community services can also be extended, either by the virtual community server manager or by its own members. For instance, using WiKi or other technologies that allow viewers to modify the web pages online, members can all participate in the process of updating services themselves.

There are different ways to allow users to access virtual communities based on resources. Traditional virtual communities can be accessed using web browser to connect to a special web site web browsers or using specialized software such as IRC client to connect a particular newsgroup, discussion forum or chatting room. However, since our system needs to understand user's access for resources, a requirement is that every time the user is accessing a resource, say, a new web site, or a new web page or new software, the corresponding virtual community based on the resource user is accessing should also be connected. In another word, the virtual community is tightly coupled by the users' resource accessing activities so the traditional approach does not work.

This invention discloses several methods that can be used for on-line web resources and other resources. Various ways are disclosed to associate user's resource access such as web surfing, software using, or other resource usage to the corresponding virtual communities.

Figure 4:
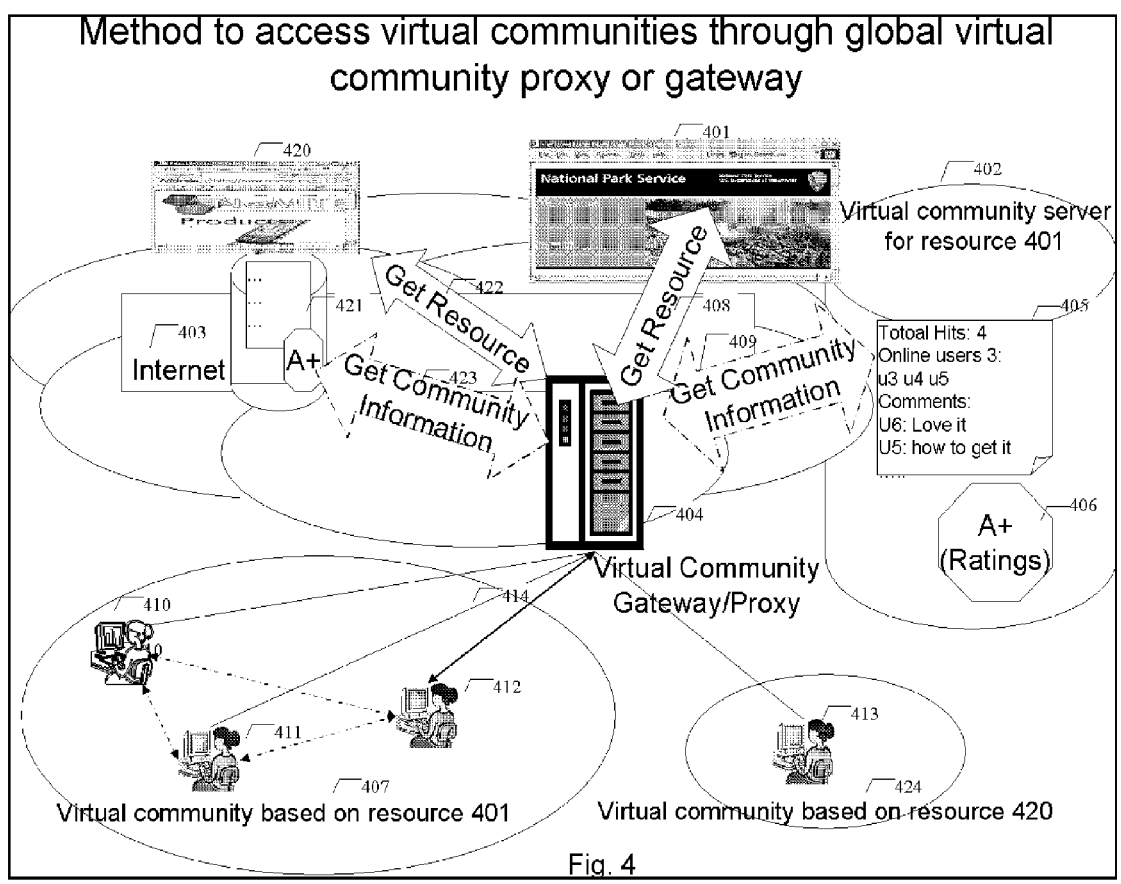
FIG. 4 shows the method to enable users to access the virtual communities based on the web resource through a global virtual community proxy or gateway.

For the most popular resource in the Internet—web resources such as web pages and web sites. FIG. 4 shows the first method where users can access virtual community based on any web resource through a global virtual community proxy or gateway. This means, before web surfing, the users set the Internet settings in their browsers to use the global virtual community proxy server (404) for all the web access. The settings can also be set by an installation program automatically.

Once the proxy server address has been set, all users (410, 411, 412, 413) will connect to the proxy server (404) to retrieve any web resources—web sites or web pages. The proxy server intercept a request (414) for the web resource (401); then forward it to the target web server (401) and sends response (408) back to the user. Meanwhile, the proxy can also send the current community server information (402) through separate channel (409) to the browser, this can be either a separate browser window, separate frame or another pop-up window. During this process, unless feature being turned off, the current user is automatically added to the virtual community so other users can see that a new user has just joined unless the user choose anonymous or invisible mode. Meanwhile, the statistical information such as hit count for this resource will be updated.

Each time a new user, say (411) accessed the web resource (401), it also go through the same process. First, user sends a request through a regular http connection (414) to proxy server first (404), then proxy server forward the request (408) to web server (401) and then sends the result back to the user (411). Meanwhile, as the proxy knows which resource the user is accessing now, it can find the corresponding virtual community (409) based on this web resource (401); add this new user (411) to the community, then retrieve community information (402) such as bulletin board (405), resource rating (406) or other users' status. This community information will be sent back to the user (411) to be presented in an additional community window. From then on, the new user (411) can then access the virtual community information in the new community window, either directly or also going through the proxy server.

Without the virtual community, there is no easy way for a user to see others who are also accessing the same resource. So, most of the time, users only exchange information with each other when they are using the resource upon which the virtual community is based.

Virtual community can provide all kinds of services such as chatting services, file sharing or others for users to conduct any collaborating activities within the virtual community. Once after users know each other in the virtual community, there is also other possible ways for users to send messages directly off the virtual community—such as sending emails, chatting by regular instant messengers.

When a user, say user (413) switches to another web resource (420), she sends another request to proxy (404) for accessing resource (42) and the proxy server will forward the request to the resource server (420) in the Internet (403) with regular HTTP or other type of connections (422). Meanwhile, the virtual community (421) for the new web resource (420) is contacted through connection (423), with community information being retrieved and sent back to the user in the community window.

The virtual community proxy can be a kind of gateway that connects to other virtual community proxy servers. It can also provide additional filtering on the contents as well. The only thing users need to do is to first change the browser settings to the proxy or gateway address, after that, users' browsing capability are still the same. The use of proxy has been widely used in many company networks already. All the community proxy settings and additional connections are transparent to users but the users can benefit from the added features to communicate with the virtual communities as they are browsing.

If the users are reluctant to change or setup proxy settings, the can also use the browser to directly connect to the virtual community proxy server. In this case, the proxy server, which itself is sort of a web server, can act as a proxy server to redirect access to any resource in the Internet. This is similar to many anonymizer web site or HTTP proxies in the Internet that are used to bypass filters in firewalls. This can be implemented by frames, URL forwarding, CGI or other kind of relaying technique. The effect is still that the proxy server (404) gets all web requests from users and then redirect to the real server for the resources (401) while at the same time can connect to the virtual community server based on the resource that users are accessing. This has the same effect as changing browser settings.

There are some drawbacks for this proxy approach in additional to changing the browser settings. One is that the information a user accesses must be in the public Internet (403). If not, for example, if the web resource is in a private network or local area network, or requiring special authentication or login, then the virtual community proxy server may not be able to retrieve those resources on behavior of the user. Only with special configuration can it also access those private servers off the Internet or in local networks. The other is that since all web traffic goes through the proxy and some people who access sensitive data or care too much about data security may not like to use the proxy.

Figure 5:
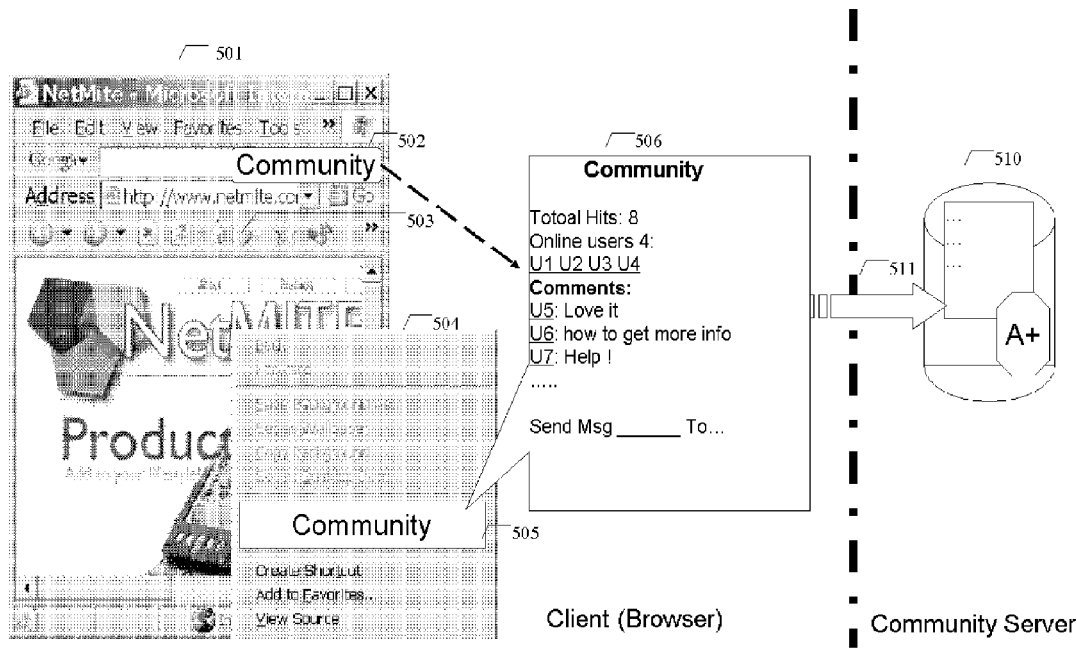
FIG. 5 shows method to use browser toolbar button or context menu to connect to the virtual community based on the current web resource being accessed by users.

Because of those problems, this invention gives another approach as shown in FIG. 5.

This method is to install a custom toolbar button, status bar or context menu into users' browser (501) so that whenever the user browses to any web resource (503), he is able to click the virtual community button (502) or he can select the community button from the context menu (505) of the page. After this, a popup window, or separate web page, or balloon window (506) is shown at user's browser to present the current virtual community page with information retrieved from the virtual community server (510) for the current web resource.

In the community popup window (506) various information are presented to the user such as total hit counts, current community members, comments from other users. All those information are also hyperlinks that can be further explored by the user with a click of mouse. Different hyperlinks can be used for different purpose or link to different services, such as compose a message or reply a message.

This approach gives user the control when he wants to join or view the virtual community based on the web resource they are accessing. The custom toolbar, context menu or status bar can be installed either manually or automatically by the browser.

But there is one draw back of this method: extra step for users a user needs to click the context toolbar or menu to initiate the action to enter the virtual community. To overcome this shortcoming, the third method is to install a standalone application or special software agent in the user's computer.

The purpose of that special software agent is to monitor all web requests resulting from the web browsers. It can be implemented either by hooking into the protocol handling chain; or using a protocol filter, kernel driver or customized content handler; or listening to the system or windows event from browsers; or hooking into process, system or network APIs. For every web request, the special software agent automatically looks up the virtual community for that resource the user is accessing, signs in the current user to the community and then retrieves the community to the user.

This standalone application can itself be a customized browser. Many browser, such as Internet Explorer can be extended by developers to extend its functionality. Some other browsers such as Mosaic or Netscape are open source. So writing a new browser based by reusing existing browser is not difficult. However, one drawback for this method is that some users may hesitate to switch to a new browser or do not want to install or start the additional software. In this case, the fourth method using of browser plugin object can be used.

Figure 6:
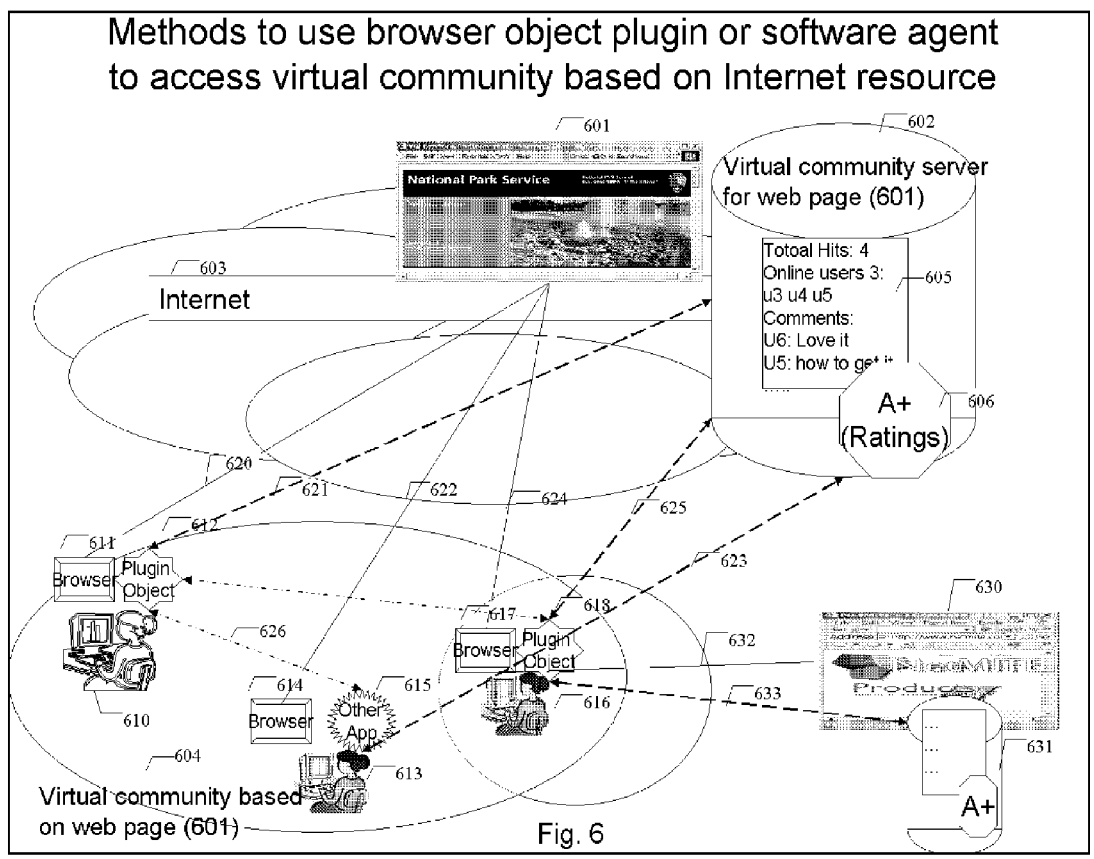
FIG. 6 illustrates methods using either browser plugin object or special software monitor agent to access virtual community based on web resources accessed with browsers.

FIG. 6 illustrate both cases to enable users to access virtual community based on any web resource through either standalone application or a browser plugin object. Browser plugin objects are generic name for those software components that work together with browser and extend the functionality of browsers to provide additional feature to the end users. They include browser helper objects, plugins, applets, java script or flash, ActiveX object, content, dynamic html, connection or protocol filters and any other type of software extensions.

Most modern software are component-based software which allow thirdparty software vendor to write plugins to extend its functionality. Browsers are with no exception. For example, most browser software allow other developers to develop plugins to enhance its capabilities. The functions of those additional objects are used to filter web contents, render new media types, display dynamic information, run java applets, interpret javaScript or VBScript in the web page, or enhance user interactions with web pages.

In this invention, the browser plugin object is to provide user the additional interactivities with the virtual communities. With the help from browser, every time when the user visits a web page or web site, the plugin object can connect to the virtual community for that web resource.

Using plugins does not need user to change the browser he has been used to but provides the functions we need. In addition, most browser plugins can be installed automatically if the user's existing browser does not have installed the plugin while the web server requires the use of such plugin. This can greatly simplify the process as installing new software is also a complicated work.

In FIG. 6, before users (610, 613, 616) can access the resource based virtual communities, the browser plugin objects (612, 618) in the fourth method or the special monitor software agent (615) mentioned in the third method must be installed. They can be installed manually or automatically when the users use browsers (611, 614, 617) to visit certain web sites.

Once the plugin object or special monitor program is installed, every time a user uses the browser to access a web resource—web site or web page, the plugin object will be notified for such browsing activity. The plugin object uses the URL of the web resource to find out the corresponding virtual community for that web resource, sign the user in the community so other current online members can know about his presence. Then it may present to the user the community information such as other currently online members. The presentation can be in any form that helps user's main browsing activity in a non-disrupting way, Such as in the context menu, status bar, popup window, balloon help message, task bar or even embedded inside the current web page by changing the web page content dynamically. After that, users can access the other information, resource or services in the virtual community by clicking the embedded links.

For example, when user (610) accesses the web resource (601), his browser (611) sends request directly to the web server (601) in Internet through connection (620). Meanwhile, the plugin object (612) is notified for that event, and uses a separate connection (621) to contact the virtual community (602) based on resource (601). The plugin object (612) uses the URL of the web page (601) that the user is current visiting to find the correct virtual community only for this web page. It may also return the current community information or data through the same connection which may include comments from other users (605), total users' rating (606) and other relevant data.

Another user (613) uses standalone software agent (615) which monitors the web activity of the browser (614). When she (613) joins the group by visiting the same web page (601), the web browser (614) still communicates with server (601) through regular HTTP connection (622). As soon as the special monitor software agent (615) detects this, it makes another connection (623) to the web page 601 based virtual community (602) and discovers that user (610) is online. Now both of them are on line in the same community based on resource (601), they could start chatting to each other (626) within the community (604).

User can also visit multiple resources. For example, user (616) could be visiting both web page (601) and (630). She can open two windows at the same time and her browser (617) establishes two connections (624, 632) to both resources (602, 630). As she is accessing two resources, her plugin object (or special agent) also makes two connections, one (625) to the first community (602) and the other (633) to the second community (631). She can see current members of first community including user (610) and (613) and can exchange real time messages with them. She (616) can also talk to other members in the second community as the same time. This is an example how one user can simultaneously participate in multiple communities.

With the help of the plugin object or special software agent, even when users access some restricted resources such as internal websites in intranet behind firewall, with user permitting, user can still connect to some private virtual communities based on private resources—since they may not in the Internet. For security reasons, private virtual communities based on private resources can setup authentication rules so they can be accessed by authorized members. This way, even people are working at home, or from other countries, as long as they are authorized, they can conduct the collaboration when they are accessing the same resources. This feature is especially useful for big companies with multiple sites across the world or resources shared by multiple groups or companies.

To access the private virtual community based on private resources, each private resources must also has a unique URL. The reason is that virtual communities are identified by the resource it based on which is uniquely located by its URL. Authentication can be enabled for those communities in the community servers and various means of security can be enforced such as username password or cookies. Another way is to setup the community server behind firewalls which limits the members to all users from within the same intranet.

The virtual community can also be provided by each web servers. For example, web servers can either support virtual community themselves or, on each web request, contact the virtual community based on the resource users are accessing and then sends both results of the request and the community info back to the client.

However, this approach is the last approach we prefer. As we state before, this approach requires that all existing web servers been upgraded and support the either resource based virtual communities or redirecting request to other virtual communities servers. It is well known that upgrading server side components is much more difficult than individual software in the client side because most servers are being accessed many times 24 hours a day. Furthermore, separating the resource based communities from resource itself helps communication for users within multiple communities.

So far, resources we have been discussed are Internet resources that can be directly through web browsers. Web sites or web pages are used in our illustrations and examples. However, this invention does not limit the type of resource to be Internet or web resource only. Instead, any kind of resource can be the subject of the virtual community and virtual community can be based on any resources that can be used or shared by group of peoples. The other kind of resources includes—software, FTP site, newsgroup, files, images, photos, or games. In general, people access those resources by purchasing the product and using individually. However, since many users can still use the same product at the same time, these users can form the basis for the virtual community based on that resource.

Figure 7:
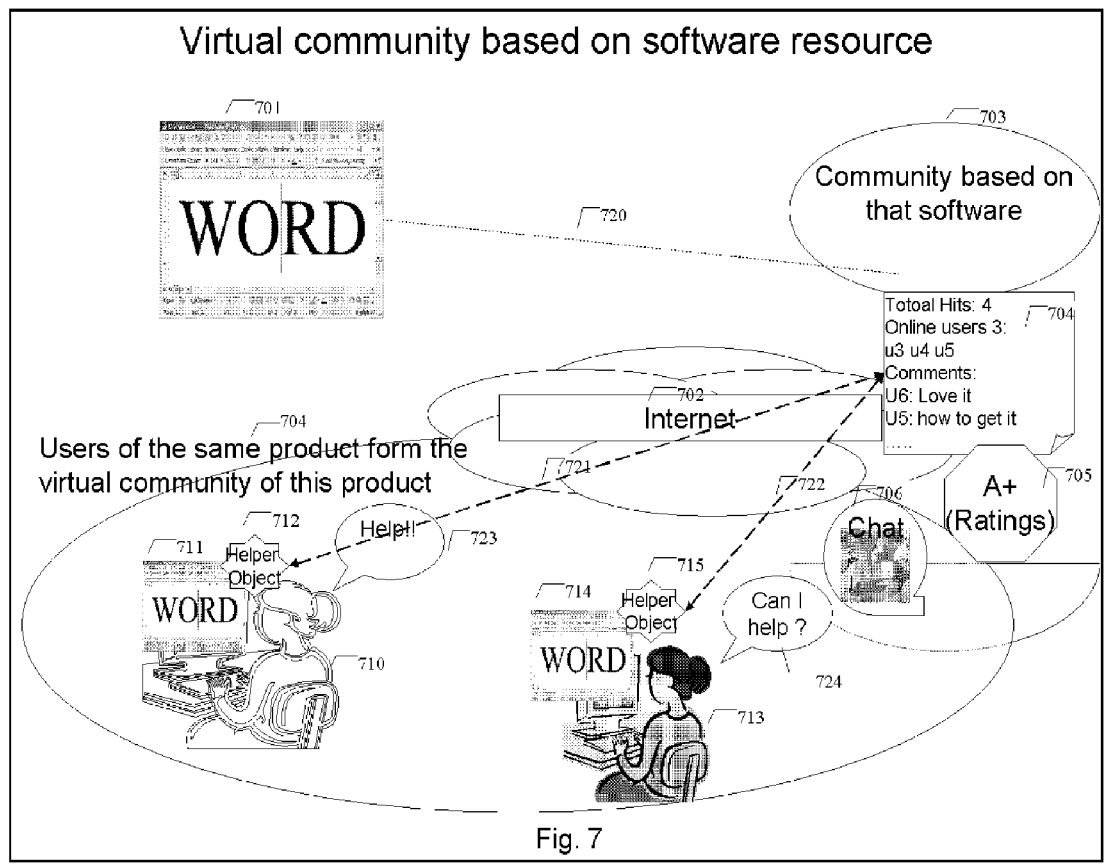
FIG. 7 illustrates the virtual community based software product and how software users can collaborate in the community when they are using the software.

FIG. 7 illustrates the virtual community based on those who use the same product on their own computers and how they can collaborate in the community and help each other to resolve problem. Actually, this method does not only apply to software, but also to any resources or products that can be used in computers, such as games, online movies.

Software products (701) people are using does not need to be shared or network based. Typically the software is single user software that is used by a user on his own computer. The software itself may not have the capability to connect to the Internet nor does it a web application. In the past, when one user uses a product such as new software, or word processor, if he encounters some problem, the only way for him to ask for help is to call the support line. Later, there might be some web page, or discussion forums or newsgroups for those products that users can search for help, post questions and looking for answers. However, none of those methods are intuitive to new users because people have to either know exactly where to look, or search various sources for helps and the result is—most people simply don't know how to do it.

With our resource based community, although each product is still used by each individual only. But in the whole world, there are potentially a lot of users who are also using the same software (or resource) at the same time, all of them form the basis for such resource based virtual communities. Whenever connected to the community, any user can immediately see other users who are also using the same product at the same time. So he can ask for help, look for comments, FAQ, and reviews, or chat with other expert users. As a community member, he is no longer alone and be happy.

This method attaches the software in the users' computer with a special component, shared object, dynamic library, driver, or other extensions (which we called helper object) to the main application has the same life cycles with the main software. This helper object will start as soon as the user starts to use the software and terminate when user stops using the product. The main purpose is to automatically connect to the virtual community based on the specific software or product the user is using in his own computer. The function of the helper object is similar to plugin object in browsers, but instead of response on browsing event, it responses on product or software usage a different type of resource access. The communication part to the virtual community and presentation of the community information are still unchanged.

The helper object can be statically linked to the targeting software component or it can hook into systems or monitors system event so that it can be started together with the original software. It can reside in the main window of the software application; or seamlessly integrate with the main application for its new functions and features, for example, main software can invoke the community services or applications with context menus or toolbars. Another very useful case is that, a single helper object can be installed in one computer that can recognize all current running software and handle the virtual communities for multiple or all software in the system. It needs only to recognize the current software running and be able to lookup the virtual communities based on the name of every software product.

In FIG. 7, when a user (710) starts to run the software (701) on her own computer (711), the helper object also gets started and starts to connect (721) to the virtual community server (703) for that software which lies somewhere in the Internet (703). It may also access and present community information and services back to the user such as other users and bulletin board (704), ratings (705) or chatting service (706). The community is based on the unique software identifier so that this community is only uniquely associated with that particular product (720) and community members are users of that particular product (701).

If that user (710) needs some help on a particular subject, she can send out help messages (723) to the chatting service (706) of the virtual community. Meanwhile, another person in the world (713) is also using the same software (701) in his computer (714) so he connected by the helper object (715) to the virtual community (704) through a separate connection (722). When he sees the help message from the first user (710) he can immediately send back answers (724) to the first user (710). Furthermore, it is possible for them to exchange more messages or conduct more advanced collaborating activities that any other regular community allows.

In this example, resource accessed (701) is not a web resource but a software product. Actually, the resource can be replaced by any other software, product, or service available to users. The resource itself does not need to be Internet (702) based. It is the helper object needs to be able to connect to the Internet, the virtual community server or other members since it is the medium through which users can connect to the community and thus to other people in the community.

Sometimes, there are cases where the resource are not being used in a computer connecting to the Internet, such as a PDA, cellular phone or any other non computer related product such as audio, video, or other commodities. In this case, as long as we can uniquely identify this resource, such as by resource name or special URL, people can manually go to the main virtual communities' server or web site, search for this specific virtual community based on this resource and then access the virtual community directly. Similar to any other kinds of communities, people can search for their favorite communities by browsing to a central place and enter keywords such as topics or select from categories. This method should work for all kinds of resource based on virtual community. But it does not guarantee the simultaneousness between access to the community and the resource itself.

Now that we have discussed different methods to allow users to access the virtual communities associated with various types of resources including web resource in the Internet and non Internet resources such as software, next we'll come to the point of how virtual community servers are used in this resource based virtual community system.

We disclose a method to setup a global universal virtual community server or group of servers to satisfy the requirement for all resources and users in the world. The universal virtual community server or servers can be set up and organized in a way that for every resource in the Internet, or even the world, there is a corresponding virtual community based on that resource, whose members composing users who are visiting, have visited, or will visit the resource.

Figure 8:
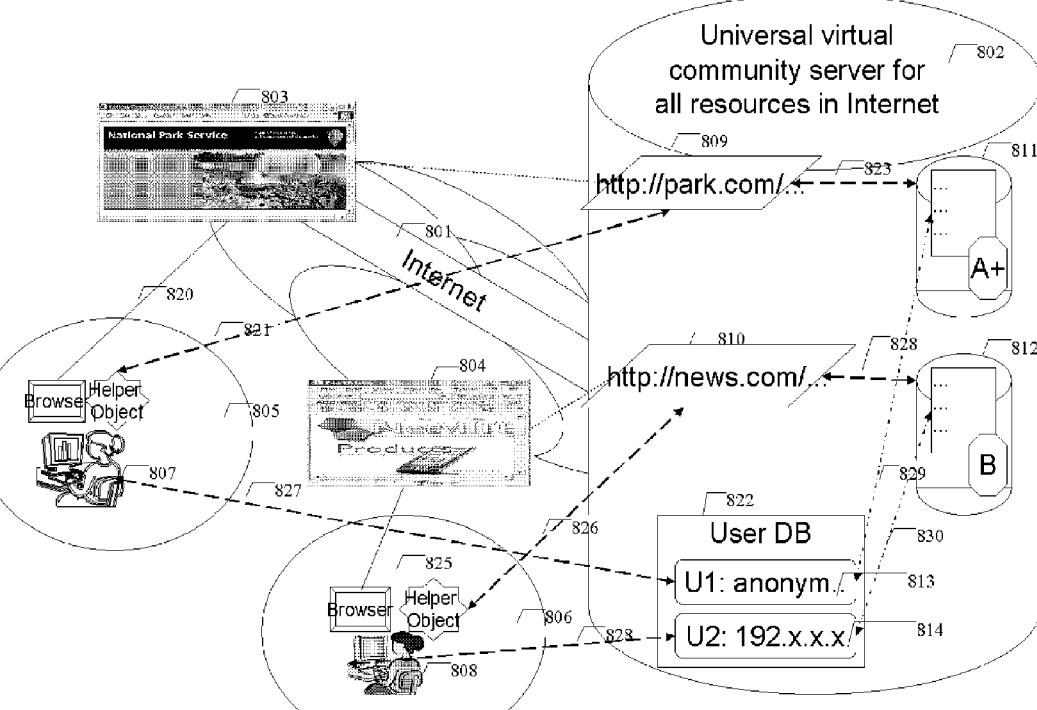
FIG. 8 illustrates the architecture of the universal virtual community server or group of servers that are used to keep track of virtual community based on all resources in the Internet.

FIG. 8 illustrates the architecture of the universal virtual community server or group of servers that are used to keep track of virtual community based on all resources in the Internet.

Here, what we want to achieve is to use a global universal virtual community server or group of servers connected together to provide ways to map various resource URL to different virtual community areas or sub servers. This universal community server composes several parts: a global user database that holds all possible users in the Internet are accessing any resource in the Internet; various virtual community areas or sub servers to hold the community information, data and links of all current community users in the users' database; mapping mechanisms to map any resource URL to the give virtual community areas, and map from any known user identify, give email or IP address, to a particular user entry in the global user database; a request dispatcher to dispatch all users' requests in the Internet to the corresponding virtual community area or sub servers by the resource URL.

In this universal virtual community system, whenever any people just visits a new resource such as web page that does not already corresponds to a virtual community in the server, a new virtual community area will be created on demand or in the fly so that following requests to the same web resource will go directly to this newly created community. This is called lazy creation of the virtual community which does not need to pre-create all virtual communities in advance and can save a lots of resources. The same lazy creation is also true for the global user database—a user entry may be created in the user database only when he first accesses some resource and am looking for the virtual community based on that resource.

Each virtual community area can be viewed as a sub-server similar to a web site where it may contains multiple dynamic web pages that list current online users, total hit counts, bulletin boards and comments left by other users. It may be stored in directories, files, or databases, either locally or distributed machines. It is composed many server side components that support sign in a new user, logout a user, send messages among users, they can also provide other collaboration services such as interest matching, on-line vote, ratings, on-line bid, dating, broadcasting or marketing and so on. The virtual community sub server does not need to keep individual user's information but keep references of users to the global user database. This way, it can communicate users who are currently in other communities.

The actual implementation or internal structure of each virtual community sub server itself is not that important, such as what kind of services the virtual community can provide, how they are provided, or the actual implementation of each service are also not covered because there are many ways to implement them. For example, sub server can be simply a web server or web pages. Also various server side technologies from server side script, CGI, Servlet, asp to recent web services and weblog can be used.

The global user database is used to keep all individual users' information, for example, its identifier and current status such as whether it is online or offline. It may also keep a copy of all users' personal data such as messages from others. Each user can be identified by a unique ID, if the user does not provide, it can be identified the user's IP address combined with some kind of automatically generated data such as cookies. The global user database maintains such a mapping from user ID to its real data. User preferences or settings such as privacy, security settings can also be stored there. For example, the system uses them to determine if the user should be anonymous or invisible to the rest of the community. The implementation of user database is not limited to a real database, it can be implemented in any way that can support above functions, including using file system or distributed mechanism.

The universal virtual community server is responsible for dispatching request from users in the world looking for the corresponding virtual community. Whenever a user accesses a resource in the Internet, the client also query universal virtual community server by providing the current user ID and the resource URL. The universal virtual community server then uses the URL mapping to locate the corresponding virtual community area and uses the user ID mapping to locate the right user in the user DB. After adding the user into that community, it returns back the main content in the community area from where the user can conduct other community activities.

In FIG. 8, the universal virtual community server is a server that is shown as (802). The URL mapping (823) maps URL (809) of web page (803) to the community area or sub server (811); mapping (828) maps URL (810) of web resource (804) to community area (812). For scalability and performance, the universal virtual community server and community areas may compose of a cluster of servers instead of one single server, but we can still view the cluster of servers as one logical server so the concept is still the same. Another view of the universal virtual community server is a huge database server or index server that is capable of looking up the virtual community by the resource URL.

When a user (808) accesses resource (804), her browser fetches the web page (804) through connection (825) and she automatically becomes member of virtual community (806) on resource (804). Then her browser plugin object sends a request (826) to the universal virtual community server (802) to find the related virtual community information (812). If this resource has been accessed in the past by other users, the virtual community area has already been created, so the server uses the URL mapping (828) to locate the community area by its URL (810). It also uses the user info (828) to locate the actual user information (814) in the global user database (822) and add the user to the community (830). Finally it return the community area information (812) back to the requesting user (808) through connection (826).

If it is the first time ever access to the virtual community, for instance, when a user (807) is accesses resource (803), she uses regular HTTP connection (820) to get the web resource from its own web server. Meanwhile, the browser plugin object will connect to the universal virtual community server (802) though a separate connection (821) to find out the virtual community area (811) for resource (803). Since the virtual community area (811) has never been accessed before the universal virtual community server will first create a new virtual community area (811) on the fly and then added the mapping (823) from the resource URL (809) of resource (803). Typically, the URL (809) is the same as the URL of the resource (803) for web resources, for other type of resources, the URL can be anything that can uniquely identify the resource (803).

Same thing happens for the user entry (813) for the real user (807) in the user database (822), where new users are also created dynamically. Once the virtual community sub server is created, the new user (807) is added to the virtual community area, or sub server so that others can see her. Finally, the original request (821) returns with the current virtual community information (811) based on resource (803).

Each virtual community area or sub-servers can provide all functionality that a normal community can provide. For example, people can review contents, vote for topics, chat, publish comments.

Each individual virtual community area or sub-server keep track of current online users with links from the user identifier to entries of the user database (822). Whenever a user leave the page, or switch to another resource, its existence in the current communities is also removed but user entry in the global user database still persists. If that user has left some messages or comments in the communities he visited, other users can still send messages to him though his user ID to the entries (813, 814) in the global user database (822). Next time, when the same user connects to another community, since all communities share the same global user database (822), the universal virtual community server discovers that there now has some pending messages from other users, the messages could also be returned to that user.

Users have full control over their own privacies and securities in the global user database. For example, he can choose to sign in anonymously or be invisible to others, whatever mode he chooses, he still has full access to the community resources and services and can still send receive messages or other collaborative activities. For people access the Internet from behind a gateway or firewall, this system still works.

In some cases, different virtual communities can be grouped together to form a larger communities which cover similar resource, topics, or subjects. For example, a virtual community for a web site can contains all users who access the web individual web pages. The universal community server can easily handle this situation by linking or grouping all communities sub servers together to form a larger community for a bigger scope of resources. The only difference is that the resource is now a group of resources instead of individual resource.

This system and methods can be extended in a number ways and to many other areas other than Internet. As we stated before, security or authentication can be added to some private communities for people who are using some private resources. The universal community servers can also be installed in a private network like corporate network. Of course, all users need to configure the plugin or helper object to use the internal community server instead of the global universal community server. Such collaboration and community system is helpful for companies to create user friendly and cooperative environments for all their workers. Also filtering can be applied to the communities or contents before delivered to user, depends on user preference or system, communities settings, for instance, to protect children from accessing adult contents.

The invention claimed is:

1. A virtual community system managing a plurality of users and a plurality of resources accessible by said plurality of users comprising:

a community server;

at least one component monitoring each user of said plurality of users accessing said plurality of resources;

said community server associating each resource of said plurality of resources accessed by each user of said plurality of users user to said each user of said plurality of users;

said community server creating persistent virtual community for each of said resources; said virtual community including those users accessing said each of said resource and user generated content that is created by users who accessed or are accessing a resource to share with others;

said community server enabling community members to communicate with users in virtual communities outside the persistent virtual community using virtual community real-time connections;

wherein the community server is further operating to combine a plurality of communities into a larger community based upon similar resource use; at least one component displaying user generated content associated with said resource to each user when said user is accessing said resource; said user generated content is created by said user during his visit to said resource.

2. The system of claim 1, wherein each of the plurality of resources is associated with a corresponding community.

3. The system of claim 1, wherein each of the plurality of resources comprises a web resource.

4. The system of claim 1, wherein each of the plurality of resources comprises a non-web resource.

5. The system of claim 1, wherein each of the plurality of resources has a unique name.

6. The system of claim 1, wherein users automatically become members of the virtual community associated with said particular resource when they access the resource.

7. The system of claim 1, wherein the community server is further operating to provide community services to community members.

8. The system of claim 1, wherein the community server is further operating to enable communication between community members.

9. The system of claim 1, wherein the community server is further operating to enable community members to perform community activities.

10. The system of claim 1, wherein the community server is further operating to provide collaboration between community members.

11. The system of claim 1, wherein the community server is further operating to provide notification to community members when a new user joins the community.

12. The system of claim 1, wherein the community server is further operating to provide community members with information regarding the community.

13. The system of claim 12, wherein the information comprises information presented to the community members while they are accessing the particular resource.

14. The system of claim 1, wherein the community server is further operating to enable new community services provided by community members.

15. The system of claim 1, wherein said resources comprise private resources each having a unique name.

16. The system of claim 1, wherein the community server is further operating to provide community member authentication services.

17. The system of claim 1, further comprising a web resource server associated with said particular resource.

18. The system of claim 17, wherein each web resource server can contact at least one of said community servers to provide community services.

19. The system of claim 1, wherein the community server is disposed behind a firewall to limit community members to users in an intranet.

20. The system of claim 1, wherein the community server is further operating to provide user privacy preferences to community members.

21. The system of claim 1, wherein the community server is further operating to uniquely identify each community member across multiple communities.

22. The system of claim 1, wherein the community server is further operating to track community member's activities.

23. The system of claim 1, wherein the community server is further operating to organize an information content for each virtual community into a plurality of hyperlinked pages.

24. The system of claim 1, wherein the community server is further operating to keep statistical information regarding the community.

25. The system of claim 1, wherein the community server is further operating to connect users who have accessed the same resource.

26. The system of claim 1, further comprising a proxy server coupled to the community server and a web resource server, the proxy server operating to serve a web resource content and connect to the community based on the resource being served.

27. The system of claim 1, wherein the community server is further operating to enable searches of each of the plurality of communities from a web site.

28. The system of claim 1, wherein the community server is further operating to provide customized filtering preferences set by users, systems and communities.

29. A method of managing a plurality of users and a plurality of resources accessible by said plurality of users in a virtual community system containing a community server, the method comprising the steps of:
monitoring each user of said plurality of users accessing said plurality of resources;
associating each resource of said plurality of resources accessed by each user of said plurality of users user to said each user of said plurality of users;
creating persistent virtual community for each of said resources; said virtual community including those users accessing said each of said resource and user generated content that is created by users who accessed or are accessing a resource to share with others;
enabling community members to communicate with users in virtual communities outside the persistent virtual community using virtual community real-time connections;
wherein the community server is further operating to combine a plurality of communities into a larger community based upon similar resource use; displaying user generated content associated with said resource to each user when said user accessing said resource; said user generated content is created by said-user during his visit to said resource.

30. The system of claim 29, wherein each of the plurality of resources is associated with a corresponding community.

31. The method of claim 29, wherein each of the plurality of resources comprises a web resource.

32. The method of claim 29, wherein each of the plurality of resources comprises a non-web resource.

33. The method of claim 29, wherein each of the plurality of resources has a unique name.

34. The method of claim 29, wherein users automatically become members of the virtual community associated with said particular resource when they access the resource.

35. The method of claim 29, wherein the community server is further operating to provide community services to community members.

36. The method of claim 29, wherein the community server is further operating to enable communication between community members.

37. The method of claim 29, wherein the community server is further operating to enable community members to perform community activities.

38. The method of claim 29, wherein the community server is further operating to provide collaboration between community members.

39. The method of claim 29, wherein the community server is further operating to provide notification to community members when a new user joins the community.

40. The method of claim 29, wherein the community server is further operating to provide community members with information regarding the community.

41. The method of claim 40, wherein the information comprises information presented to the community members while they are accessing the particular resource.

42. The method of claim 29, wherein the community server is further operating to enable new community services provided by community members.

43. The method of claim 29, wherein said resources comprise private resources each having a unique name.

44. The method of claim 29, wherein the community server is further operating to provide community member authentication services.

45. The method of claim 29, further comprising a web resource server associated with said particular resource.

46. The method of claim 45, wherein each web resource server can contact at least one of said community servers to provide community services.

47. The method of claim 29, wherein the community server is disposed behind a firewall to limit community members to users in an intranet.

48. The method of claim 29, wherein the community server is further operating to provide user privacy preferences to community members.

49. The method of claim 29, wherein the community server is further operating to uniquely identify each community member across multiple communities.

50. The method of claim 29, wherein the community server is further operating to track community member's activities.

51. The method of claim 29, wherein the community server is further operating to organize an information content for each virtual community into a plurality of hyperlinked pages.

52. The method of claim 29, wherein the community server is further operating to keep statistical information regarding the community.

53. The method of claim 29, wherein the community server is further operating to connect users who have accessed the same resource.

54. The method of claim 29, further comprising a proxy server coupled to the community server and a web resource server, the proxy server operating to serve a web resource content and connect to the community based on the resource being served.

55. The method of claim 29, wherein the community server is further operating to enable searches of each of the plurality of communities from a web site.

56. The method of claim 29, wherein the community server is further operating to provide customized filtering preferences set by users, systems and communities.

* * * * *